Jan. 6, 1925.
J. CIBELLI
1,522,102
ELECTRICIAN'S TOOL
Filed July 16, 1923
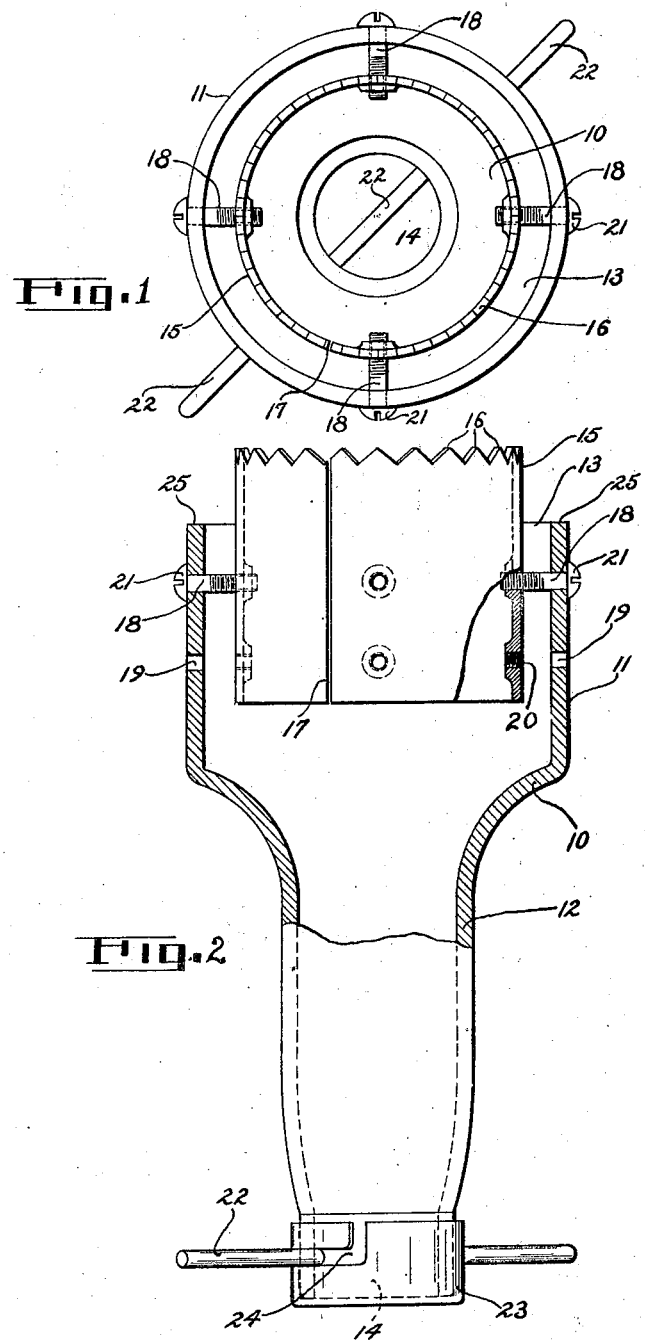
INVENTOR.
John Cibelli
BY G. H. Braddock
ATTORNEY.

Patented Jan. 6, 1925.

1,522,102

UNITED STATES PATENT OFFICE.

JOHN CIBELLI, OF BRIDGEPORT, CONNECTICUT.

ELECTRICIAN'S TOOL.

Application filed July 16, 1923. Serial No. 651,937.

*To all whom it may concern:*

Be it known that JOHN CIBELLI, a citizen of the United States, and resident of Bridgeport, in the county of Fairfield and State of Connecticut, has invented certain new and useful Improvements in Electricians' Tools, of which the following is a specification.

This invention relates to an electrician's tool, and has more especial reference to a tool for cutting openings in plaster walls, usually ceilings, for the reception of outlet boxes or the like.

An object of the invention is to provide a novel, simple, inexpensive, practical and durable tool for cutting openings, ordinarily of cylindrical conformation, in plaster.

A further object is to provide an electrician's tool of the present character which will be capable of catching all of the particles of plaster as removed from a ceiling or wall, without liability of any broken bits of plaster falling upon floors, furniture or furnishings beneath said ceiling or wall.

Further objects are to provide a cutting tool which will make a clean cut in plaster; to provide the tool with a cutter capable of adjustment to cut openings of varying, predetermined depths; and to provide the tool with means whereby all of the material or plaster cut from a ceiling or wall can be readily and completely removed from the tool.

With the above and other objects in view, the invention comprises the construction, arrangement and combination of parts as now to be fully described and as herein to be specifically claimed, it being understood that the disclosures herein are merely illustrative of the principles of the invention and meant in no limiting sense, changes in details of construction and arrangement of parts being permissible so long as within the scope of the appended claims.

In the accompanying drawing forming a part of this specification,

Fig. 1 is an end elevational view of the novel tool; and

Fig. 2 is a central, longitudinal sectional view, partially in side elevation, of the tool.

With respect to the drawing and the numerals of reference indicated thereon, 10 denotes the hollow handle of the improved electrician's tool, consisting of a relatively large cylindrical portion 11, and a relatively small cylindrical portion 12. As disclosed the hollow handle is a casting having its large end open as at 13 and its small end open as at 14.

Numeral 15 denotes a hollow, cylindrical saw or cutter provided on its forward edge with cutting teeth 16. The cylindrical cutter may be composed of a single strip of saw blade steel curled to circular form as shown, 17 representing the free ends of said curled strip of steel adjacent each other, or the cylindrical cutter may be of different construction. The hollow cylindrical cutter 15 is arranged in the relatively large cylindrical portion 11 of the hollow handle 10, in spaced relation to the wall of said relatively large cylindrical portion, to project beyond the open end 13 of the hollow handle. Preferably, the cutter is concentric with the wall of the portion 11 and is rigidly fixed in said portion by means of screw bolts 18 passing through holes 19 in the wall of the hollow handle and entering threaded holes 20 in the hollow cylindrical cutter. Evidently, driving the screw bolts home so that their heads 21 bear against the outer surface of the wall of the hollow handle insures the fixed position of the cylindrical cutter. As disclosed I utilize four screw bolts and space them at equal distance apart about the novel tool.

As will be more clear from Fig. 2, there are a plurality of sets of holes 19, 20 in the hollow handle and cutter, respectively. By utilization of any desired combination of these sets of holes, the cutter can protrude beyond the large cylindrical portion of the hollow handle any distance to cut openings in plaster of any predetermined depth. Numeral 22 denotes an actuating rod for manipulating the hollow handle, the rod extending, preferably centrally, transversely through the relatively small cylindrical portion 12 of the hollow handle and being fixedly situated therein desirably adjacent the open end 14. 23 is a removable cover cap for the open end 14 of said small cylindrical portion of the hollow handle, it preferably having a bayonet slot 24 for detachable engagement in ordinary manner with the actuating rod 22.

The manner in which the tool is used is apparent. The cutting teeth 16 of the hollow cylindrical cutter 15 are placed squarely against plaster in which an opening is to be made. By means of the actuating rod 22 the hollow handle is rotated or oscillated, as may be preferred, and pressure is applied to force the teeth 16 into the plaster. Evidently, removed plaster drops into the hollow handle, either through the hollow, cylindrical cutter 15 or through the space 13 between said hollow cutter and the large cylindrical portion 11 of the hollow handle. No particles or bits of plaster can clear the hollow handle to fall to a floor or the like.

The edge 25 of the hollow handle, adjacent the open end 13, limits the extent to which the cutter 15 can be imbedded in plaster. Hence, by setting the cutter to protrude the desired distance beyond said edge 25, an opening of predetermined depth can be cut.

When plaster is to be removed from the hollow handle, the cover 23 is turned slightly to release the bayonet slot from the rod 22. When the plaster has fallen through the opening 14 and the removable cover has been replaced, the tool is again ready for use.

Having thus fully described the invention, what I claim as new and desire to secure by Letters Patent is:—

1. A device of the character described, comprising a hollow handle, and a hollow, cylindrical cutter arranged in and protruding beyond said handle, the cutter being spaced from the wall of said handle, and the handle forming a receptacle for cuttings made by the cutter.

2. A device of the character described, comprising a hollow handle, a hollow, cylindrical cutter arranged in and protruding beyond the said handle, the cutter being spaced from the wall of said handle and the handle forming a receptacle for cuttings made by the cutter and means whereby the cutter can protrude any distance beyond the handle.

3. A device of the character described, comprising a hollow handle open at both ends, a hollow cylindrical cutter arranged in one end of said handle and spaced from the wall thereof, the handle forming a receptacle for cuttings made by the cutter and a removable cover over the other end of said handle.

4. A device of the character described, comprising a hollow handle including a relatively large cylindrical portion and a relatively small cylindrical portion, each of said portions having an open end, a hollow cylindrical cutter removably arranged in said large cylindrical portion and spaced from the wall thereof, and a removable cap covering the open end of said small cylindrical portion.

5. A device as specified in claim 4, wherein screw bolts engaging the wall of said large cylindrical portion and entering the wall of said hollow cylindrical cutter constitute means for removably securing the cutter in the hollow handle.

Signed at Bridgeport in the county of Fairfield and State of Connecticut this 14th day of July A. D., 1923.

JOHN CIBELLI.